(12) United States Patent
Sreejith et al.

(10) Patent No.: US 7,027,404 B2
(45) Date of Patent: Apr. 11, 2006

(54) MECHANISM FOR CELL ROUTING IN A MULTI-STAGE FABRIC WITH INPUT QUEUING

(75) Inventors: Sreedharan P. Sreejith, Murphy, TX (US); Praseeth K. Sreedharan, Murphy, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 816 days.

(21) Appl. No.: 09/933,333

(22) Filed: Aug. 20, 2001

(65) Prior Publication Data

US 2003/0035432 A1 Feb. 20, 2003

(51) Int. Cl.
*H04L 12/26* (2006.01)
(52) U.S. Cl. ...................... 370/238; 370/252
(58) Field of Classification Search ............. 370/238, 370/238.1, 252

See application file for complete search history.

(56) References Cited

U.S. PATENT DOCUMENTS

| | | | |
|---|---|---|---|
| 6,795,432 B1* | 9/2004 | Lee | 370/388 |
| 2003/0035432 A1* | 2/2003 | Sreejith et al. | 370/415 |
| 2003/0118013 A1* | 6/2003 | Steele et al. | 370/388 |

* cited by examiner

Primary Examiner—Melvin Marcelo (57) ABSTRACT

A head of line (HOL) blocking count value, which is directly proportional to the committed traffic load for traffic flow through an output port within a multi-stage switch mesh, is computed for a path by adding the values associated with all output ports within the path. In selecting a route, all paths from the source to the destination are identified and sorted by head of line blocking count value. Rather than selecting a path based on traffic load, the path having the lowest head of line blocking count value and sufficient capacity for the requested traffic is selected, with selection between paths having equal head of line blocking count values being made based on traffic load.

20 Claims, 4 Drawing Sheets

MECHANISM FOR CELL ROUTING IN A MULTI-STAGE FABRIC WITH INPUT QUEUING

TECHNICAL FIELD OF THE INVENTION

The present invention is directed, in general, to routing traffic through a multi-stage switch mesh or a switch fabric having multiple paths between each pair of input and output ports and, more specifically, to selecting cell paths within such a multi-stage switch mesh or multi-path switch fabric employing input queue to minimize head of line blocking and improve throughput for large numbers of independent traffic flows.

BACKGROUND OF THE INVENTION

A switch (or "switch fabric") routes data traffic from one of N input ports to one of N output ports. A multi-stage switch mesh includes a plurality of switches inter-connects via inputs and outputs to provide a non-blocking architecture effectively acting like a large switch fabric with a large number of input and output ports.

In connection-oriented (as opposed to packet-oriented) technologies such as asynchronous transfer mode (ATM), a cell path is computed from an input port through the switch or switch mesh to an output port during the connection setup time and remains the same throughout the lifetime of the connection (e.g., until a requested data transfer is complete). The path is uniquely identified by a label and each cell presented at the input port of the first switch within the path has this routing label attached, together with an assigned or requested priority. The switch fabric or switch mesh fabric places queues received cells in the input queues of the corresponding priority for the input port identified in the routing label, where each input port has associated therewith more than one input queue each having a different priority. The cell scheduler within the switch fabric identifies the output port from the routing label and transfers the cell based on the associated priority.

The input queues of a switch fabric are typically of a fixed size, with one input queue for each possible priority associated with each input port. Each port and each input queue is normally independent, with no sharing of resources. If for some reason an input queue becomes full and cannot receive any more cells, the upstream traffic source is informed utilizing a flow control mechanism such as "back-pressure," which effectively reduces the congestion in the forward direction by blocking the traffic at the source itself.

Input queues become congested when cells cannot be placed to the output port because higher or equal priority queues from the same input port or a different input port are scheduled for transfer to the desired output port before the subject cell. Cell departure must therefore be delayed or rescheduled for a later time.

One effect of cell congestion is "head of line" blocking, where cells queued at an input port cannot be serviced even if the corresponding output port is free because another cell ahead of the blocked cell(s) is still waiting for resources from a different output port. Congestion thus spreads very quickly within the system and reduces overall switching throughput.

In a multi-stage switch mesh, or a switch fabric including multiple paths between each input and output port, the overall performance depends heavily on the traffic path of various cell streams through the switch or switch mesh. There is, therefore, a need in the art for a method of selecting cell flows with switch fabric or a switch mesh to minimize head of line blocking and improve overall performance.

SUMMARY OF THE INVENTION

To address the above-discussed deficiencies of the prior art, it is a primary object of the present invention to provide, for use in selecting a path for traffic flow within a multi-stage switch mesh, a head of line (HOL) blocking count value, which is directly proportional to the committed traffic load through an output port and is computed for a path by adding the values associated with all output ports within the path. In selecting a route, all paths from the source to the destination are identified and sorted by head of line blocking count value. Rather than selecting a path based on traffic load, the path having the lowest head of line blocking count value and sufficient capacity for the requested traffic is selected, with selection between paths having equal head of line blocking count values being made based on traffic load.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1A–1B and 2A–2B, discussed below, and the various embodiment used to describe the principles of the present invention in this patent document are by way of illustration only and should not be construed in any way to limit the scope of the invention. Those skilled in the art will understand that the principles of the present invention may be implemented in any suitably arranged device.

Figure 1A:
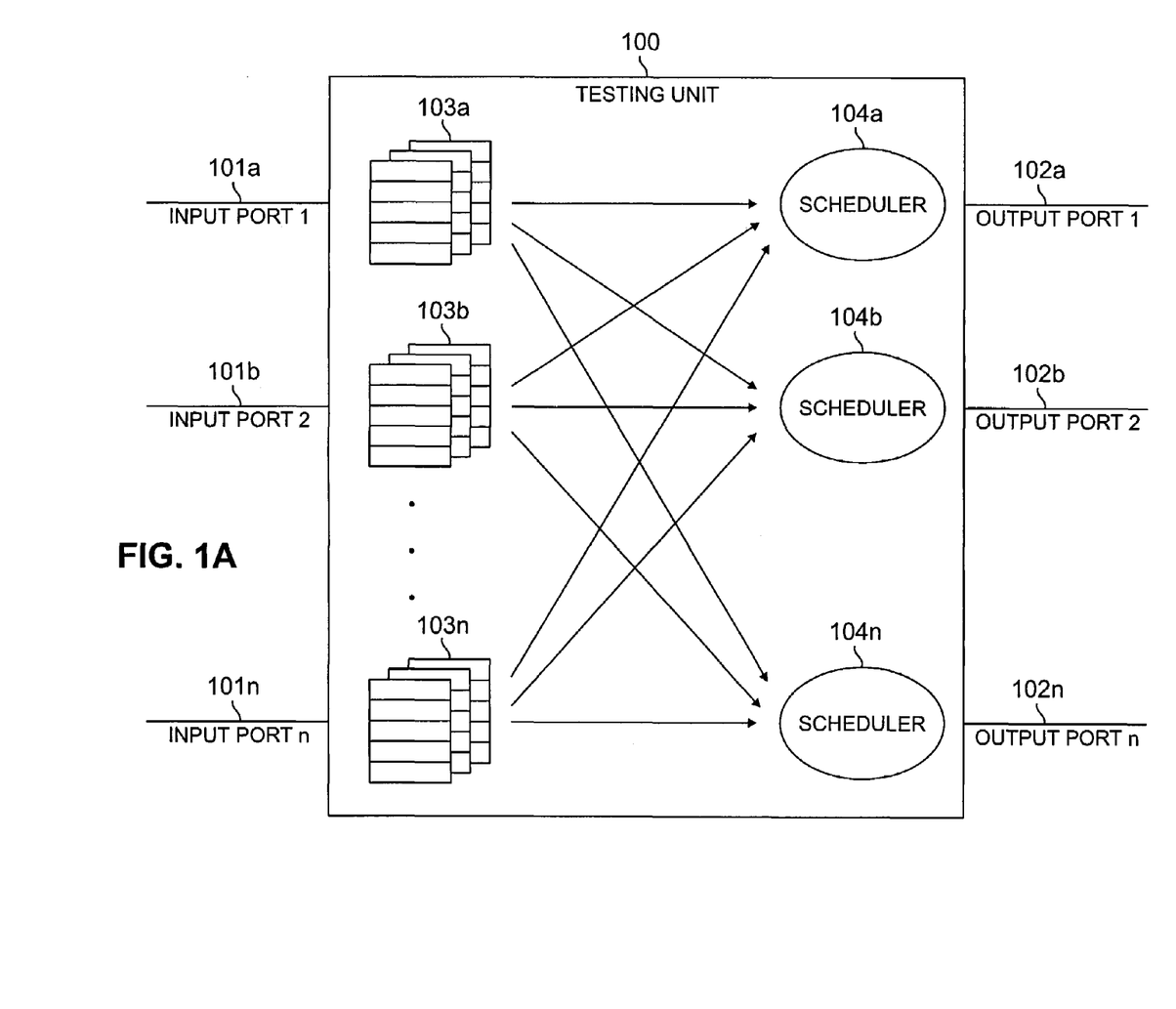
FIGS. 1A and 1B depict a switch and a switch mesh, respectively, in which cell flows are selected to minimize head of line blocking according to one embodiment of the present invention.
Figure 1B:
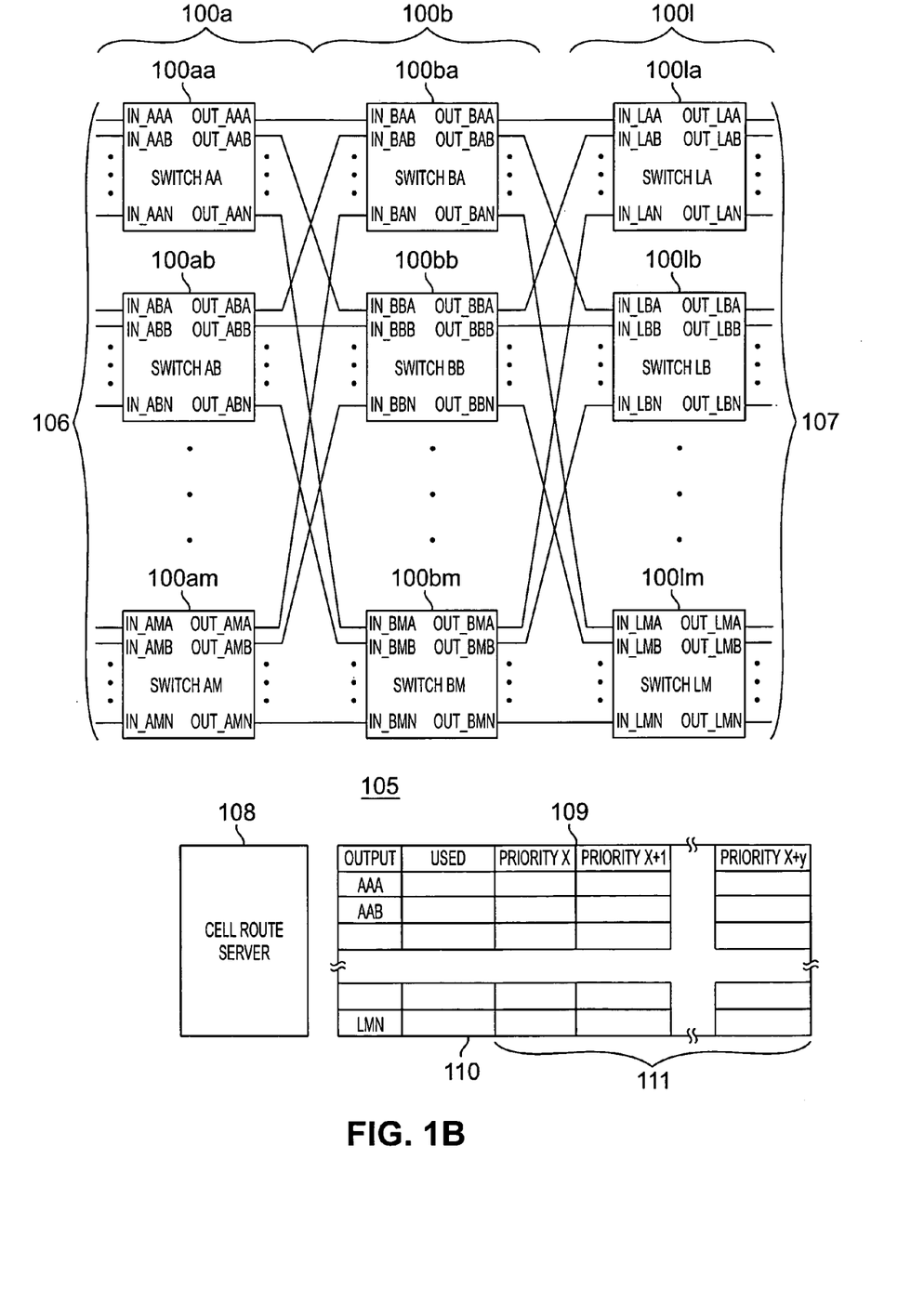

FIGS. 1A and 1B depict a switch and a switch mesh, respectively, in which cell flows are selected to minimize head of line blocking according to one embodiment of the present invention. FIG. 1A depicts a switch fabric 100 including a plurality of input ports 101a–101n (where "n" represents any positive, nonzero integer) and a plurality of output ports 102a–102n. Each input ports 101a–101n has associated therewith one of a number of sets of input queues 103a–103n, where each set of input queues 103a–103n includes a queue for each possible priority. Each output port 102a–102n has associated therewith a scheduler 104a–104n for scheduling cell transfer from a queue within one of the sets of input queues 103a–103n to the respective output port 104a–104n. Switch fabric 100 may include redundant communications paths (i.e., multiple parallel paths) between each input port 101a–101n and/or the associated input queues 103a–103n to each of the output ports 102a–102n.

FIG. 1B depicts a switch mesh 105 including an array of interconnected switches 100aa–100am, 100ba–100bm, and 100la–100lm (where "l" and "m" are any positive, nonzero integers, not necessarily equal, although "m" preferably equals "n"), each switch having the structure of switch 100 depicted in FIG. 1A. Switch mesh 105 is organized in a plurality of stages 100a, 100b and 100l, preferably three. The input ports 106 of switch mesh 105 are the input ports of the switches 100aa–100am within the first stage 100a, while the output ports 107 of switch mesh 105 are the output ports of the switches 100la–100lm within the last stage 100l. As illustrated, the remaining input and output ports of switches 100aa–100am, 100ba–100bm, and 100la–100lm are interconnected in accordance with the known art to allow switch mesh 105 to operate as a large or extended switch fabric.

FIGS. 1A and 1B and the above description do not depict or describe all details of the complete construction and operation of switch 100 and switch mesh 105. However, those skilled in the art will understand that the present invention may be practiced with conventional switches or switch meshes, and only so much of the construction and operation of such conventional switches or switch meshes which is unique to the present invention or necessary for an understanding of the present is depicted in the figures and described herein.

Input queues 103a–103n and/or schedulers 104a–104n within switch 100, and within each switch 100aa–100lm within switch mesh 105, are coupled to a cell routing server 108, a centralized controller for determining cell routing through the switch 100 or switch mesh 105 and selecting the cell path from the input port receiving the subject cell to the target output port.

The traditional approach for selecting cell paths through a switch or switch mesh is based on selection of a "least loaded path" between the input ports and output ports. Although this approach provides sufficient throughput under normal circumstances, switch fabrics or meshes which employ input queuing and flow control based on back pressure can experience congestion as described above, with throughput worsening as the number of independent traffic flows through the switch fabric or mesh increases.

Selection of paths according to the present invention follows a two-dimensional approach where both head of line blocking effects and traffic load are considered for path calculation. Path selection by cell routing server 108 in the present invention relies on two assumptions:

1. As long as the traffic load in within the physical capacity of the switch fabric or switch mesh, traffic load does not affect performance; and
2. Interference of traffic streams from other input ports (i.e., head of line blocking) is the principal factor affecting overall switch performance.

Cell routing server 108 is linked to connections table or database 109 containing an identification of all currently active path connections from input port(s) to output port(s) through switch 100 or switch mesh 105, including bandwidth statistics. For each output port 102a–102n or 107 of switch 100 or switch mesh 105, cell routing controller 108 maintains a used capacity count 110, the cell stream data transfer rate expressed in cells/second, and head of line blocking counts 111 for each priority in that port.

For each output port 102a–102n or 107, one input port is designated as the "desired" input port, with traffic from that input port 101a–101n or 106 having a head of line blocking count value of zero (i.e., no effect). All remaining input ports are considered "undesired" input ports for the subject output port. The head of line (HOL) blocking count value for a traffic flow is directly proportional to the committed traffic load (e.g., equal to the traffic load in cells/second).

When a connection to an output port from an undesired input port is added, the head of line count for the new traffic flow is added to the current sum of head of line counts for the corresponding priority at the target output port. Thus, connections table 109 will contain a plurality of head of line blocking count values for each output port 102a–102n or 107, one for each possible priority. The head of line blocking count value for a given priority is the sum of all head of line blocking counts for the existing connections to the subject output port with higher or equal priorities.

Thus, if a given output port 102n is, at the moment of interest, the subject of connection paths A, B and C having committed remaining traffic loads of $C_A$, $C_B$ and $C_C$ cells/second, respectively, where each of connection paths A, B and C have a priority higher than or equal to a particular priority X, the head of line blocking count value for that particular priority X at the output port 102n is the sum of the head of line blocking count values of connection paths A, B and C, which equals to $$HOL_{total} = HOL_A + HOL_B + HOL_C$$

Where:
$HOL_A = K*C_A/C_L$ and
$HOL_B = K*C_B/C_L$ and
$HOL_C = K*C_C/C_L$

Again, the term $C_L$ is the total capacity (bandwidth) of the outgoing port. The term K is a variable whose value is 0 for connections from the desired ports, and is a system wide constant greater than 0 for connections from undesired input ports. (Note: the value of K should be selected in such a way that when large numbers of connections are added to the port, the counters holding the HOL values do not overflow. However, giving very small values for K may cause less accuracy during integer divisions in some systems).

For a single switch having multiple paths between each pair of input and output ports, the head of line blocking count is determined individually for each path. For a multi-stage switch mesh, the head of line blocking count for any path between an input port and an output port is the sum of the head of line blocking counts for all output ports within that path. Thus, for example, the head of line blocking counts for various paths from input port IN_AAA to output port OUT_LMN within multi-stage switch mesh 105 in FIG. 1B are the sums of the head of line blocking counts for output ports: OUT_AAA, OUT_BAN and OUT_LMN; OUT_AAB, OUT_BBN and OUT_LMN; or OUT_AAN, OUT_BMN and OUT_LMN. Additionally, the head of line blocking count for a path at a particular priority is the sum of the head of line blocking counts at the respective priority for all output ports within that path.

In selecting a path for a cell stream, the optimal route is identified by cell routing server 108 by identifying all routes from the source input port to the destination output port and sorting those routes in order of the associated head of line blocking counts. The path having the smallest head of line blocking count—and sufficient capacity for the requested cell traffic in addition to existing traffic flows within that path—is selected. If more that one path has the same head of line blocking count and sufficient capacity, the path with the least traffic load is selected.

Figure 2A:
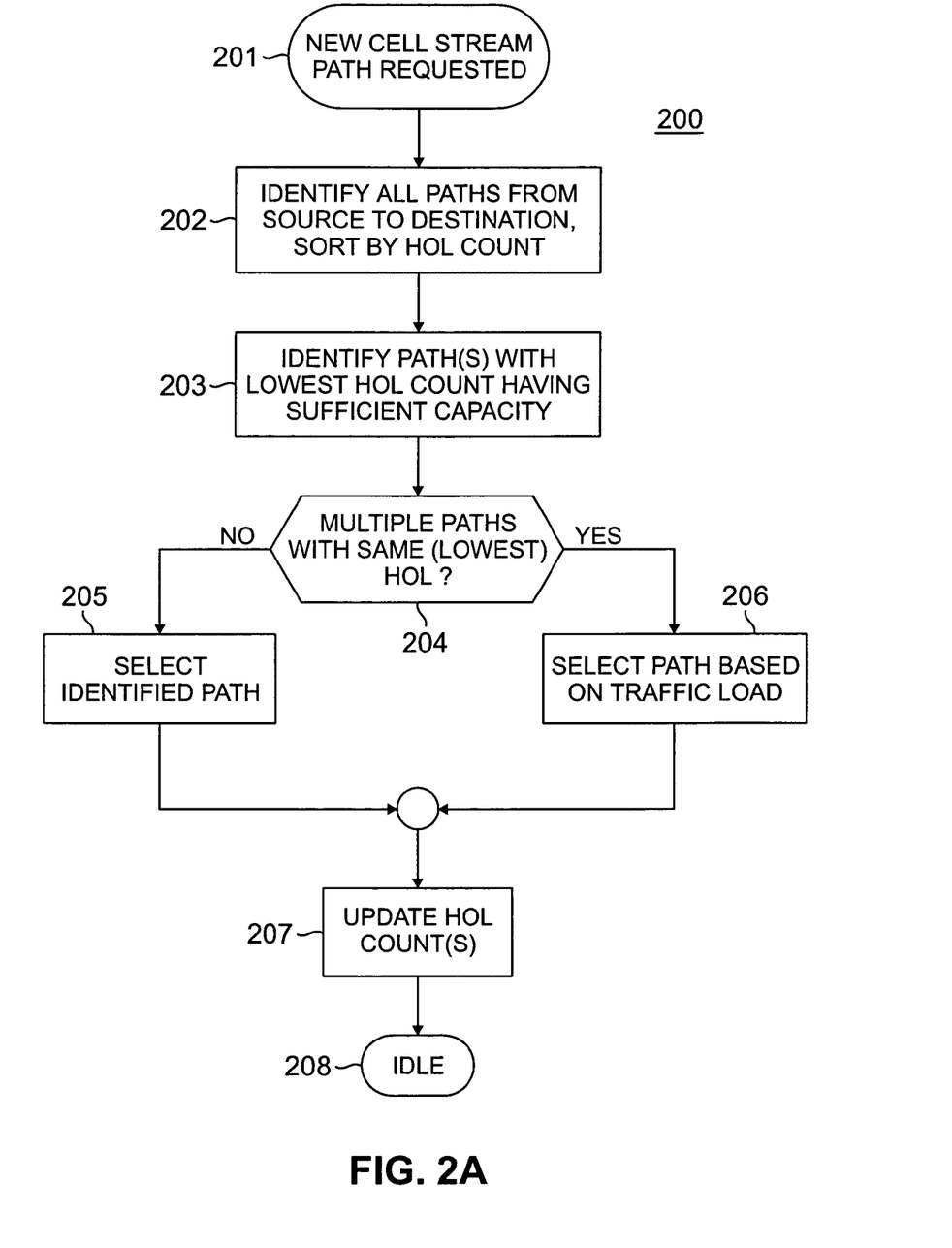
FIGS. 2A and 2B are high level flowcharts for a process of selecting communications paths for requested cell traffic through a multi-stage switch mesh according to one embodiment of the present invention.
Figure 2B:
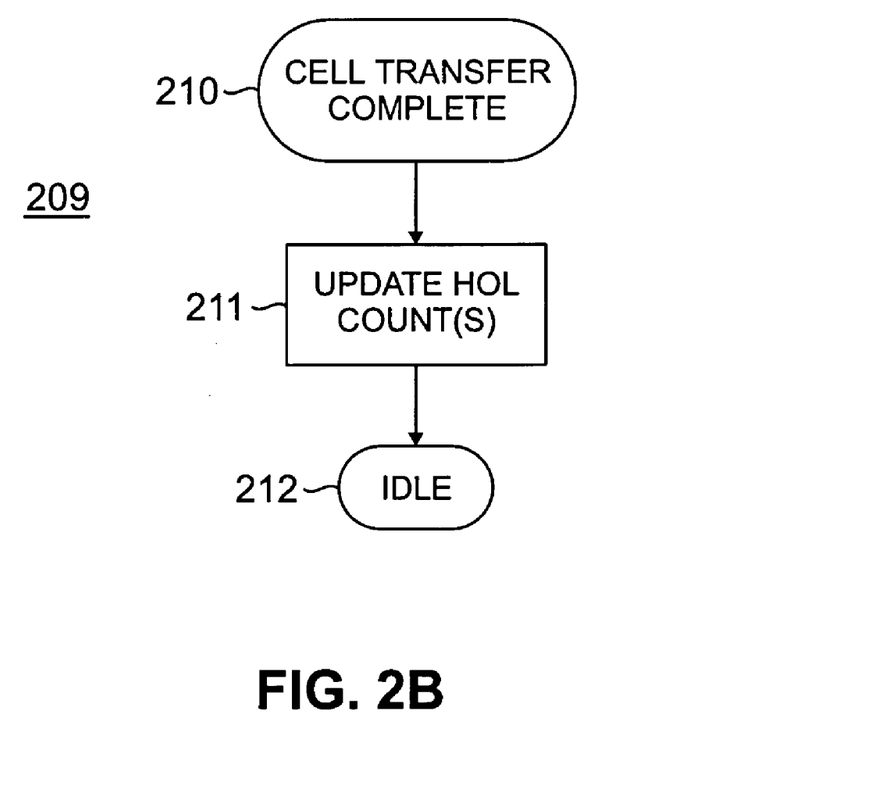

FIGS. 2A and 2B are high level flowcharts for a process of selecting communications paths for requested cell traffic through a multi-stage switch mesh according to one embodiment of the present invention. FIG. 2A illustrates a process of selecting a communications path. The process 200 begins with a request for routing of a new cell stream path from an input port to an output port (step 201). All paths between the source and destination are then identified and sorted by head of line (HOL) blocking count (step 202). From the sorted paths, the path or paths having the lowest head of line blocking count and sufficient capacity to handle the requested traffic load is identified (step 203). If only one path has the lowest head of line blocking count and sufficient capacity (step 204), the identified path is selected and the traffic routed along that path. If more than one path has the (same) lowest head of line blocking count and sufficient capacity for the requested traffic (step 204), the path is selected from among that group based on traffic loading of the various paths.

In either case, the head of line blocking count(s) for any path(s) affected by the newly added routing are updated (step 207) and the process becomes idle (step 208) until another request for routing traffic is received.

FIG. 2B illustrates a process 209 of handling completion of a cell transfer (step 210). The head of line blocking count(s) for any path(s) affected by completion of the cell transfer are updated (step 211) and the process becomes idle (step 212) until cell transfer is completed.

The present invention provides improved overall throughput in multi-stage switch fabrics, or individual switches, which includes multiple paths between each input and output port and employs input queuing with flow control based on back-pressure. The present invention can also support priority queues and may therefore be easily adapted to support various service levels or categories.

It is important to note that while the present invention has been described in the context of a fully functional switch or multi-stage switch mesh, those skilled in the art will appreciate that the mechanism of the present invention is capable of being implemented and distributed in the form of a computer usable medium of instructions in a variety of forms, and that the present invention applies equally regardless of the particular type of signal bearing medium is used to carry out the distribution. Examples of suitable computer usable mediums include: nonvolatile, hard-coded or programmable type mediums such as read only memories (ROMs) or erasable, electrically programmable read only memories (EEPROMs), recordable type mediums such as floppy disks, hard disk drives, and read/write (R/W) compact disc read only memories (CD-ROMs) or digital versatile discs (DVDs), and transmission type mediums such as digital and analog communications links.

Although the present invention has been described in detail, those skilled in the art will understand that various changes, substitutions, and alterations herein may be made without departing from the spirit and scope of the invention it its broadest form.

What is claimed is:

1. For use in a switch fabric, a routing mechanism for directing data transfers through the switch fabric between an input port and an output port, wherein the switch fabric includes a plurality of paths from the input port to the output port, the routing mechanism comprising:
   a controller determining, for each of the plurality of paths, a likelihood of existing traffic blocking a desired data transfer from the input port to the output port on the respective path,
   wherein the controller selects one of the plurality of paths having a least likelihood of being blocked by the existing traffic for the desired data transfer.

2. The routing mechanism as set forth in claim 1 wherein the switch fabric comprises a plurality of switches each having a plurality of input ports, at least one input queue associated with each input port, and a plurality of output ports, wherein the input and output ports of the plurality of switches are interconnected to form a multi-stage switch mesh, the routing mechanism further comprising:
   a tabulation of blocking count values for each output port within the multi-stage switch mesh on one of the plurality of paths, wherein each blocking count value represents a traffic load of existing traffic through the respective output port, the controller determining the likelihood of existing traffic blocking the desired data transfer for each of the paths within the plurality of paths by summing blocking count values for all output ports on the respective path, wherein the selected one of the plurality of paths has a lowest total blocking count value.

3. The routing mechanism as set forth in claim 2 wherein the blocking count values for each output port represent a traffic load of existing traffic through the respective output port from both the input part for each of the plurality of paths and other input ports within the switch fabric.

4. The routing mechanism as set forth in claim 2 wherein the tabulation includes a plurality of blocking count values for each output port within the multi-stage switch mesh on one of the plurality of paths, each of the plurality of blocking count values representing a traffic load of existing traffic through the respective output port at a priority greater than or equal to one of a plurality of priorities,
   wherein the controller employs a blocking count value corresponding to a priority of the desired data transfer in determining the likelihood of existing traffic blocking the desired data transfer for each of the paths within the plurality of paths.

5. The routing mechanism as set forth in claim 4 wherein each blocking count value for each output port represents a traffic load of existing traffic through tube respective output port train any input port within the switch fabric at a priority greater than or equal to a corresponding one of a plurality of priorities.

6. The routing mechanism as set forth in claim 2 wherein the tabulation includes an existing traffic load for each of the plurality of paths,
wherein, when two or more of the plurality of paths each have a same total blocking count value which is lower than total blocking count values for all remaining paths within the plurality of paths, the controller selects one of the two or more paths having a lowest existing traffic load.

7. The routing mechanism as set forth in claim 6 wherein controller employs the existing traffic load for each of the plurality of paths to identify a subset of paths having sufficient capacity for the desired data transfer and selects one of the subset of paths having a lowest total blocking count value as a route for the desired data transfer.

8. A switch fabric comprising:
a plurality of input ports;
a plurality of output ports, wherein each of the plurality of input ports is coupled to each of the plurality of output paths by two or more paths;
a routing mechanism for directing data transfers through the switch fabric between an input port within the plurality of input ports and an output port within the plurality of output ports, wherein the switch fabric includes a plurality of paths from the input port to the output port, the routing mechanism comprising:
a controller determining, for each of the plurality of paths, a likelihood of existing traffic blocking a desired data, transfer from the input port to the output port on the respective path,
wherein the controller selects one of the plurality of paths having a least likelihood of being blocked by the existing traffic for the desired data transfer.

9. The switch fabric as set forth in claim 8 further comprising:
a plurality of switches each having a plurality of input ports, at least one input queue associated with each input port, and a plurality of output ports, wherein the input and output ports of the plurality of switches are interconnected to form a multi-stage switch mesh, the plurality of input ports for the switch fabric formed by input ports for switches within a first stage of the multi-stage switch mesh and the plurality of output ports for the switch fabric formed by output ports for switches within a last stage of the multi-stage switch mesh;
a tabulation of blocking count values for each output port within the multi-stage switch mesh on one of the plurality of paths, wherein each blocking count value represents a traffic load of existing traffic through the respective output port, the controller determining the likelihood of existing traffic blocking the desired data transfer for each of the paths within the plurality of paths by summing blocking count values for all output ports on the respective path, wherein the selected one of the plurality of paths has a lowest total blocking count value.

10. The switch fabric as set forth in claim 9 wherein the blocking count values for each output port represent a traffic load of existing traffic through the respective output port from both the input port for each of the plurality of paths and other input ports within the switch fabric.

11. The switch fabric as set forth in claim 9 wherein the tabulation includes a plurality of blocking count values for each output port within the multi-stage switch mesh on one of the plurality of paths, each of the plurality of blocking count values representing a traffic load of existing traffic through the respective output port at a priority greater than or equal to one of a plurality of priorities,
wherein the controller employs a blocking count value corresponding to a priority of the desired data transfer in determining the likelihood of existing traffic blocking the desired data transfer for each of the paths within the plurality of paths.

12. The switch fabric as set forth in claim 11 wherein each blocking count value for each output port represents a traffic load of existing traffic through the respective output port from any input port within the switch fabric at a priority greater than or equal to a corresponding one of a plurality of priorities.

13. The switch fabric as set forth in claim 9 wherein the tabulation includes an existing traffic load for each of the plurality of paths,
wherein, when two or more of the plurality of paths each have a same total blocking count value which is lower than total blocking count values for all remaining paths within the plurality of paths, the controller selects one of the two or more paths having a lowest existing traffic load.

14. The switch fabric as set forth in claim 13 wherein controller employs the existing traffic load for each of the plurality of paths to identify a subset of paths having sufficient capacity for the desired data transfer and selects one of the subset of paths having a lowest total blocking count value as a route for the desired data transfer.

15. For use in a switch fabric, a method of directing data transfers through the switch fabric between an input port and an output port, wherein the switch fabric includes a plurality of paths from the input port to the output port, the method comprising:
determining, for each of the plurality of paths, a likelihood of existing traffic blocking a desired data transfer from the input port to the output port on the respective path; and
selecting one of the plurality of paths having a least likelihood of being blocked by the existing traffic for the desired data transfer.

16. The method as set forth in claim 15 wherein the switch fabric comprises a plurality of switches each having a plurality of input ports, at least one input queue associated with each input port, and a plurality of output ports, wherein the input and output ports of the plurality of switches are interconnected to form a multi-stage switch mesh, the method further comprising:
maintaining a tabulation of blocking count values for each output port within the multi-stage switch mesh on one of the plurality of paths, wherein each blocking count value represents a traffic load of existing traffic through the respective output port; and
determining the likelihood of existing traffic blocking the desired data transfer for each of the paths within the plurality of paths by summing blocking count values for all output ports on the respective path, wherein the selected one of the plurality of paths has a lowest total blocking count value.

17. The method as set forth in claim 16 further comprising:

setting the blocking count values for each output port to represent a, traffic load of existing traffic through the respective output port from both the input port for each of the plurality of paths and other input ports within the switch fabric.

18. The method as set forth in claim 16 further comprising:

maintaining, within the tabulation, a plurality of blocking count values for each output port within the multi-stage switch mesh on one of the plurality of paths, each of the plurality of blocking count values representing a traffic load of existing traffic through the respective output port at a priority greater than or equal to one of a plurality of priorities; and employing a blocking count value for each output port corresponding to a priority of the desired data transfer in determining the likelihood of existing traffic blocking the desired data transfer for each of the paths within the plurality of paths.

19. The method as set forth in claim 18 further comprising:

setting each blocking count value for each output port to represent a traffic load of existing traffic through the respective output port from any input port within the switch fabric at a priority greater than or equal to a corresponding one of a plurality of priorities.

20. The method as set forth in claim 16 further comprising:

maintaining, within the tabulation, an existing traffic load for each at the plurality of paths;

employing the existing traffic load for each of the plurality of paths to identify a subset of paths having sufficient capacity for the desired data transfer;

selecting one of the subset of paths having a lowest total blocking count value as a route for the desired data transfer; and when two or more of the subset of paths each have a same total blocking count value which is lower than total blocking count values far all remaining paths within the subset of paths, selecting one of the two or more paths having a lowest existing traffic load.

* * * * *

UNITED STATES PATENT AND TRADEMARK OFFICE
CERTIFICATE OF CORRECTION

PATENT NO.         : 7,027,404 B2
APPLICATION NO. : 09/933333
DATED                  : April 11, 2006
INVENTOR(S)        : Sreedharan P. Sreejith and Praseeth K. Sreedharan

It is certified that error appears in the above-identified patent and that said Letters Patent is hereby corrected as shown below:

Column 6, claim 3, line 54, delete "part" and replace with -- port --;

Column 9, claim 17, line 4, delete "," before the term "traffic" (first occurrence).

Signed and Sealed this

Twenty-first Day of November, 2006

JON W. DUDAS
*Director of the United States Patent and Trademark Office*